(12) United States Patent
Yoshitake et al.

(10) Patent No.: US 9,034,514 B2
(45) Date of Patent: May 19, 2015

(54) ELECTRIC STORAGE DEVICE

(75) Inventors: Shinsuke Yoshitake, Kyoto (JP);
Hajime Kawamoto, Osaka (JP);
Masakazu Tsutsumi, Kyoto (JP); **Jun
Nakamura**, Kyoto (JP)

(73) Assignees: GS Yuasa International Ltd.,
Kyoto-Shi, Kyoto (JP); **Honda Motor
Co., Ltd.**, Tokyo (JP)

( * ) Notice: Subject to any disclaimer, the term of this patent is extended or adjusted under 35 U.S.C. 154(b) by 28 days.

(21) Appl. No.: 13/992,645

(22) PCT Filed: Dec. 19, 2011

(86) PCT No.: PCT/JP2011/079289
§ 371 (c)(1),
(2), (4) Date: Jun. 7, 2013

(87) PCT Pub. No.: WO2012/090744
PCT Pub. Date: Jul. 5, 2012

(65) Prior Publication Data
US 2013/0260221 A1    Oct. 3, 2013

(30) Foreign Application Priority Data

Dec. 28, 2010    (JP) ................................. 2010-292001

(51) Int. Cl.
*H01M 2/02*     (2006.01)
*H01M 2/04*     (2006.01)
(Continued)

(52) U.S. Cl.
CPC . *H01M 2/02* (2013.01); *H01M 4/70* (2013.01);
*H01M 2/30* (2013.01); *H01M 4/64* (2013.01);
(Continued)

(58) Field of Classification Search
CPC ....... H01M 2/30; H01M 2/06; H01M 2/0202;
H01M 2/26; H01M 2/0217; H01M 2/263;
H01M 4/64; H01M 4/70; H01M 2/20; H01M
2/22
USPC ........................................................ 429/179
See application file for complete search history.

(56) References Cited

U.S. PATENT DOCUMENTS

| 2004/0191612 A1 | 9/2004 | Akita et al. |
| 2006/0057459 A1 | 3/2006 | Kwon |
| 2008/0038627 A1 | 2/2008 | Yamauchi et al. |

FOREIGN PATENT DOCUMENTS

| CN | 101145624 A | 3/2008 |
| JP | 2002-093402 A | 3/2002 |

(Continued)

OTHER PUBLICATIONS

English Translation of the International Search Report in PCT/JP2011/079289, dated Mar. 13, 2012.

(Continued)

*Primary Examiner* — Jane Rhee
(74) *Attorney, Agent, or Firm* — McGinn IP Law Group, PLLC (57) ABSTRACT

In order to accurately protect current collectors included in an electric storage device, the electric storage device includes an electric storage element 3 arranged inside an electric storage device case BC; an electrode terminal 5 arranged outside the electric storage device case; a current collector 4 including a first posture part FP and a second posture part SP, the first posture part FP extending along a surface of the electric storage device case on which the electrode terminal 5 is arranged, the second posture part SP extending from an end portion of the first posture part toward the side opposite to the electrode terminal, the current collector fixed at the first posture part FP by means of a fixing member 8 penetrating through an opening formed in the electric storage device case, the current collector supporting the electric storage element 3 by the second posture part SP, thereby electrically connecting the electrode terminal 5 and the electric storage element 3; and a reinforcing member 13 arranged on the side of the first posture part FP where the electric storage element 3 is present, so as to extend longer toward the second posture part side than the fixing member 8, and sandwiched and fixed between the first posture part FP and the fixing member 8.

20 Claims, 6 Drawing Sheets

(51) Int. Cl.
  *H01M 2/06* (2006.01)
  *H01M 2/26* (2006.01)
  *H01G 11/70* (2013.01)
  *H01M 4/70* (2006.01)
  *H01M 2/30* (2006.01)
  *H01M 4/64* (2006.01)
  *H01M 2/22* (2006.01)
  *H01M 2/20* (2006.01)

(52) U.S. Cl.
  CPC . *H01M 2/22* (2013.01); *H01M 2/20* (2013.01); *H01M 2/024* (2013.01); *H01M 2/043* (2013.01); *H01M 2/06* (2013.01); *H01M 2/266* (2013.01); *H01M 2/305* (2013.01); *H01G 11/70* (2013.01); *H01M 2/0202* (2013.01); *H01M 2/0237* (2013.01); *H01M 2/0215* (2013.01)

(56) References Cited

FOREIGN PATENT DOCUMENTS

| | | |
|---|---|---|
| JP | 2003-151527 A | 5/2003 |
| JP | 2003-346770 A | 12/2003 |
| JP | 2004-014173 A | 1/2004 |
| JP | 2004-207089 A | 7/2004 |
| JP | 2004-303500 A | 10/2004 |
| JP | 2006-080062 A | 3/2006 |
| JP | 2009-146601 A | 7/2009 |
| JP | 2010-092592 A | 4/2010 |
| JP | 2010-170915 A | 8/2010 |

ELECTRIC STORAGE DEVICE

FIELD OF THE INVENTION

The present invention relates to an electric storage device provided with an electric storage element; an electrode terminal; and a current collector which connect the electric storage element and the electrode terminal.

RELATED ART

In a battery cell which is one example of such an electric storage device as described above, an electrode assembly arranged inside an electric storage device case (hereinafter described as "battery case" in some cases) to serve as an electric storage element and electrode terminals arranged outside the electric storage device case are electrically connected through current collectors.

As disclosed in, for example, Patent Literature 1, each current collector is formed by bending a plate-shaped member, so as to have a shape in which the current collector includes a first posture part extending along a portion of the upper surface of a battery case where an electrode terminal is located, and a second posture part extending downward from an end portion of the first posture part.

In a case where such a shape of the current collector as described above is adopted, the first posture part of the current collector is fixed onto the upper surface of the battery case through a fixing member, such as a rivet, the electrode assembly is connected to the second posture part of the current collector by welding or the like, and the electrode assembly is supported by the second posture part.

The electrode assembly as a whole includes large-area polar plates and therefore amounts, to some degree, to a heavy load. Conventionally, the heavy electrode assembly has been supported by plate-shaped current collectors each of which is bent and formed into the first posture part and the second posture part.

In a case where such a supporting structure as described above is adopted, vibrations are absorbed by the elastic deformation of the current collectors usually made of a metal plate even if the electrode assembly housed in the battery case more or less vibrates in reaction to an external force. Accordingly, the supporting structure is protected to a certain degree from the vibration of the electrode assembly even if the supporting structure is such that the weight of the electrode assembly bears on parts of the current collectors fixed with, for example, rivets. Hence, further measures against the vibration of the electrode assembly have not been considered particularly necessary.

CITATION LIST

Patent Literature

Patent Literature 1: Japanese Patent Application Laid-Open No. 2003-346770

DISCLOSURE OF THE INVENTION

Problems to be Solved by the Invention

It has become clear, however, that such a conventional supporting structure of the electrode assembly as described above can cause damage to the current collectors depending on the condition of use of a battery cell. The above-described problem is not limited to battery cells but has been inherent in electric storage devices in general, including electric double layer capacitors, provided with an electric storage element, electrode terminals, and current collectors which connect the electric storage element and the electrode terminals.

The present invention has been accomplished in view of such circumstances as described above, and an object of the invention is to accurately protect the current collectors of an electric storage device.

Means for Solving Problems

In order to achieve this object, a first characteristic configuration of an electric storage device according to the present invention is such that the electric storage device includes an electric storage element arranged inside an electric storage device case; an electrode terminal arranged outside the electric storage device case; a current collector including a first posture part and a second posture part, the first posture part extending along a surface of the electric storage device case on which the electrode terminal is arranged, the second posture part extending from an end portion of the first posture part toward the side opposite to the electrode terminal, the current collector fixed at the first posture part by means of a fixing member penetrating through an opening formed in the electric storage device case, the current collector supporting the electric storage element by the second posture part, thereby electrically connecting the electrode terminal and the electric storage element; and a reinforcing member arranged on the first posture part side where the electric storage element is present, so as to extend longer toward the second posture part side than the fixing member, and sandwiched and fixed between the first posture part and the fixing member.

The inventors of the present invention have found that if the current collector is configured in the manner that the first posture part is fixed to the electric storage device case by means of the fixing member and the electric storage element is supported by the second posture part, small cracks arise in some cases at parts of the current collector fixed to the electric storage device case under such harsh conditions in which strong vibration or impact is constantly applied to the electric storage device.

It has turned out that if, in particular, a supporting structure in which the weight of the electric storage element is received at a fixed part, for example, a riveted part of the current collector is adopted, stress arising in the periphery of the through-hole of each fixing member (to be more exact, in the periphery of the side on which the second posture part is present), among the portions of the current collector, due to moment caused by the vibration or the like of the electric storage element supported by the current collector can be a cause for such crack generation.

Hence, in order to relieve such stress, a structure has been adopted in which stress arising due to the vibration or the like of the electric storage element supported by the current collector is dispersed by arranging a reinforcing member in the first posture part of the current collector so as to extend longer toward the second posture part side than the fixing member. As a result, stress arising in the periphery of the through-hole of the fixing member in the current collector has become smaller, thus making it possible to prevent the abovementioned crack generation.

As a matter of course, stress arising in the fixed part of the current collector can also be relieved by arranging the reinforcing member as described above even in the case of a configuration in which the weight of the electric storage element is received at a position other than the fixed part of the current collector.

A second characteristic configuration of the electric storage device according to the present invention is such that in addition to the above-described first characteristic configuration, the first posture part of the current collector and the reinforcing member are made of the same type of metal material and arranged in contact with each other. With such a configuration as described above, it is possible to prevent the contact corrosion of different type metals to be caused by the reinforcing members and the current collectors.

A third characteristic configuration of the electric storage device according to the present invention is such that in addition to the above-described first or second characteristic configuration, the current collector and the reinforcing member are formed of plate-shaped members.

If the current collector is formed of a plate-shaped member, electrical wiring inside a battery case can be routed in a compact manner. If the reinforcing member for reinforcing the current collector at the fixed part thereof is also formed of a plate-shaped member, the current collector can be reinforced in a compact manner.

A fourth characteristic configuration of the electric storage device according to the present invention is such that in addition to the above-described third characteristic configuration, the reinforcing member has a rectangular shape with a direction from a portion fixed by means of the fixing member toward a connecting portion between the first posture part and the second posture part being the longitudinal direction of the rectangular shape.

Accordingly, the reinforcing member is shaped so as to be pliable when a force caused by the vibration or the like of the electrode assembly works on the current collector. In addition, the reinforcing member disperses stress as far as locations more distant from a riveted part, thereby making it possible to disperse stress more effectively.

Advantageous Effects of the Invention

According to the above-described first characteristic configuration, stress arising in the periphery of the part of the current collector fixed by the fixing member becomes smaller, thus making it possible to prevent crack generation and accurately protect the current collector.

According to the above-described second characteristic configuration, it is possible to prevent the contact corrosion of different type metals caused by the reinforcing member and the current collector and enhance battery reliability.

According to the above-described third characteristic configuration, the fixed part of the current collector can be reinforced, while keeping an installation space as small as possible, by reinforcing the fixed part of the current collector formed of a plate-shaped member with the reinforcing member also formed of a plate-shaped member.

According to the above-described fourth characteristic configuration, stress can be dispersed more effectively by appropriately setting the shape of the reinforcing member.

DESCRIPTION OF EMBODIMENTS

Hereinafter, an embodiment of a battery cell which is one example of an electric storage device according to the present invention will be described with reference to the accompanying drawings.

In the present embodiment, a nonaqueous electrolyte secondary cell (more specifically, a lithium-ion battery cell) which is one example of secondary battery cells will be described by way of example as the battery cell.

[Configuration of Nonaqueous Electrolyte Secondary Battery RB]

Figure 1:
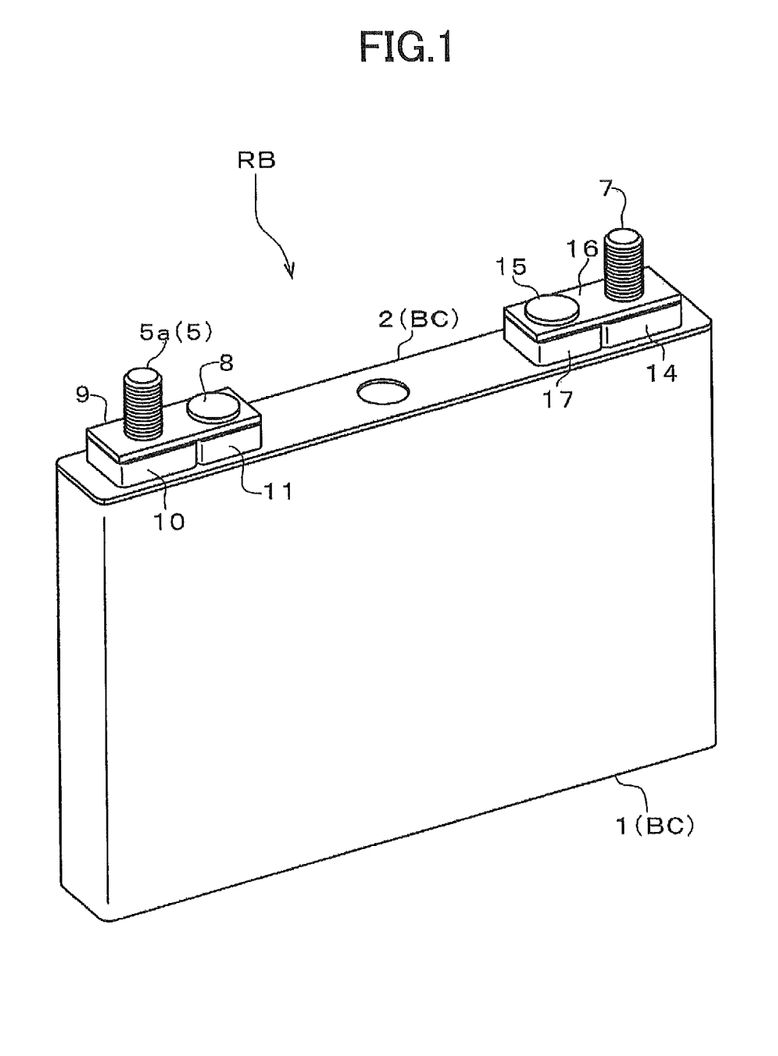
FIG. 1 is an external perspective view of a battery cell according to an embodiment of the present invention.

FIG. 1 shows a perspective view of the nonaqueous electrolyte secondary cell. A nonaqueous electrolyte secondary cell RB of the present embodiment includes, as an electric storage device case, a battery case BC (hereinafter simply referred to as "case BC") composed of a bottomed cylindrical can body, specifically, a bottomed rectangularly cylindrical can body 1, and a cover portion 2. In the case BC, a cover portion 2 is overlaid on an open surface of the can body 1 and welded thereto.

The cover portion 2 is formed of a reed-shaped rectangular plate material. A terminal bolt 5 which is a positive-polarity electrode terminal and a terminal bolt 7 which is a negative-polarity electrode terminal are fitted on a surface of the cover portion on the outer side of the case BC.

The can body 1 is a flattened rectangular solid conformal to the shape of the cover portion 2. Accordingly, the case BC as a whole also has a flattened substantially rectangular shape.

Figure 2:
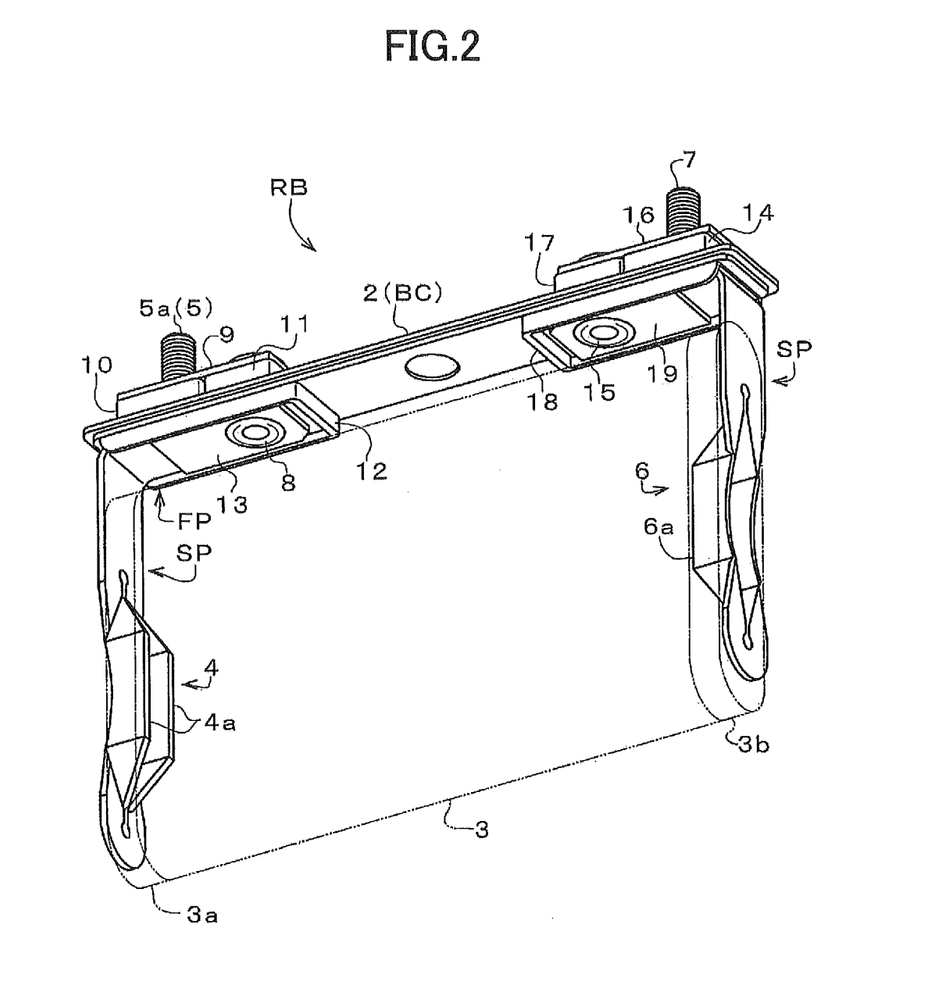
FIG. 2 is a perspective view illustrating the interior of the battery cell according to the embodiment of the present invention.

FIG. 2 shows a perspective view of the nonaqueous electrolyte secondary cell taken by looking up at the cell with the can body 1 removed. An electrode assembly 3 serving as an electric storage element and current collectors 4 and 6 (indicated by two-dot chain lines in FIG. 2) are housed and arranged inside the case BC in a state of being soaked in an electrolytic solution.

Figure 4:
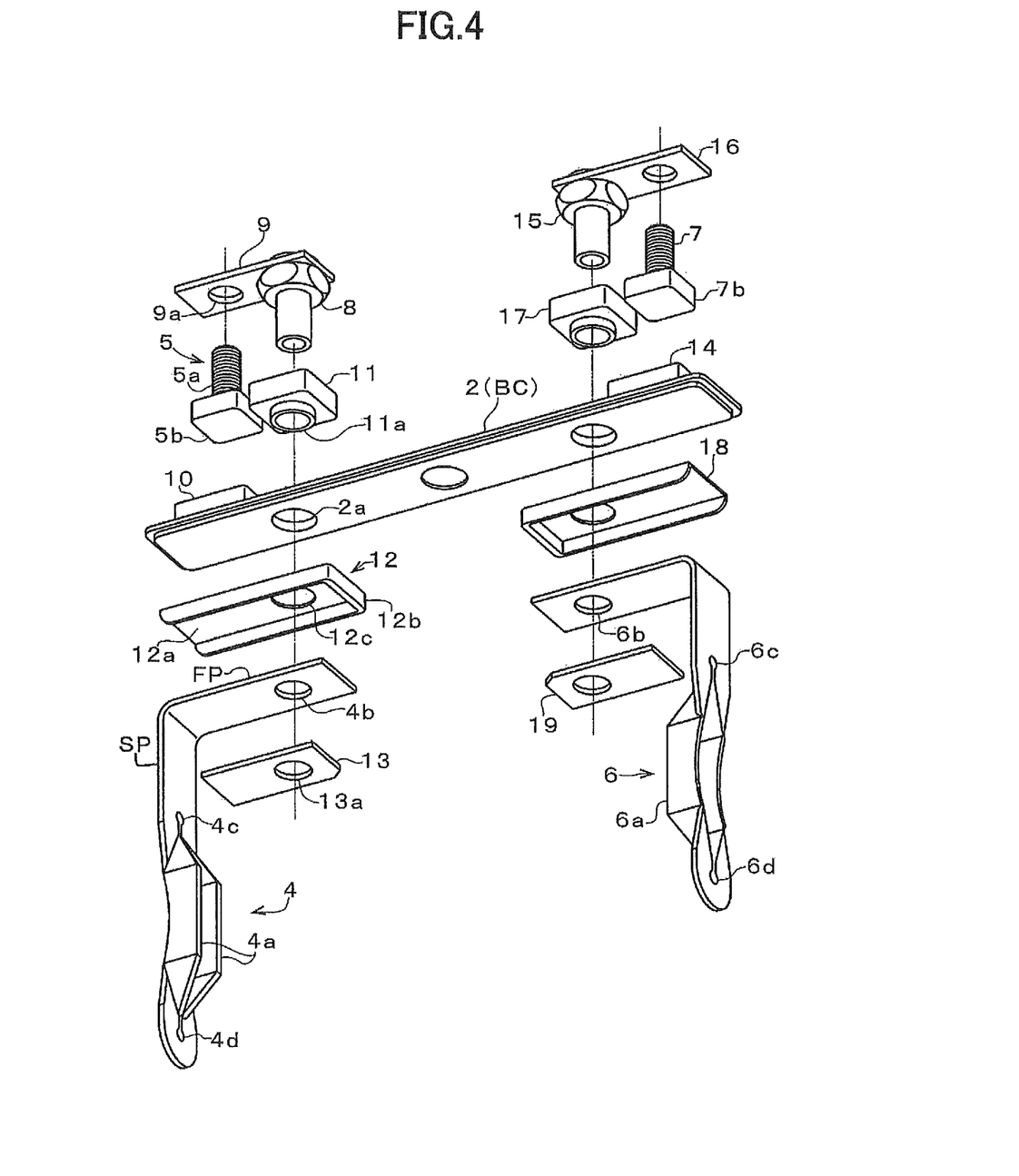
FIG. 4 is an exploded view of components according to the embodiment of the present invention.

FIG. 4 shows an exploded perspective view of components around the cover portion 2 taken in the same direction as in FIG. 2. The current collectors 4 and 6 are members used to electrically connect the electrode assembly 3 and the terminal bolts 5 and 7.

Both the current collector 4 and the current collector 6, though different in material, are electrical conductors substantially the same in shape and are arranged symmetrically. The current collector 4 on the positive polarity side is formed from aluminum, whereas the current collector 6 on the negative polarity side is formed from copper.

The current collectors 4 and 6 are constructed by bending plate-shaped members formed from the abovementioned metal materials into a predetermined shape. By way of detailed description, the current collectors 4 and 6 have a substantially L-shaped bent form in which a portion (referred to as "first posture part FP") of each current collector shaped so as to extend along a surface of the cover portion 2 on which the terminal bolts 5 and 7 are arranged and a portion (referred to as "second posture part SP") of the current collector extending from an end portion of the first posture part FP in the normal-line direction of a surface of the cover portion 2 on the inner side of the case BC extend in series, while bending 90° downward (toward a side opposite to the side where the terminal bolts 5 and 7 are present) near an end portion of the cover portion 2 in the longitudinal direction thereof.

In these second posture parts SP, the right- and left-side lateral portions of each second posture part SP are further bent toward the electrode assembly 3 side to form connecting portions 4a and 6a for connection with the electrode assembly 3. In addition, openings 4b and 6b for a rivet 8 to serve as a fixing member to be inserted through are formed in the upper end of the current collector 4.

The abovementioned connecting portions 4a and 6a are formed by forming pairs of upper and lower through-holes 4c and 4d and upper and lower through-holes 6c and 6d in the respective second posture parts of the current collectors 4 and 6 in a state of being flat plates, forming incisions between the through-holes 4c and 4d and between the through-holes 6c and 6d, and extruding the incised parts by means of press work or the like.

In the current collectors 4 and 6, the first posture parts FP are formed into a narrow rectangular shape with the longitudinal direction thereof as the longitudinal direction of the cover portion 2, in consistency with the case BC having a flattened shape. Thus, the current collectors 4 and 6 as a whole are bent so as to extend along the lateral sides of the short sides of the case BC.

The electrode assembly 3 is constructed as a so-called winding-type electrode assembly in which an active material is coated on a pair of electrode plates composed of a positive electrode plate formed into a long foil-like shape and a negative electrode plate formed into a long foil-like shape, a likewise long separator is held between the pair of electrode plates, and the electrode assembly is wound in a laminated state.

As schematically illustrated in FIG. 2, the electrode assembly 3 in a state of being wound as described above is such that active material-uncoated parts 3a of the foil-like positive electrode plate extend toward a lateral side (in a direction orthogonal to the longitudinal direction of the foil-like positive electrode plate), and active material-uncoated parts 3b of the foil-like negative electrode plate extend toward an opposed lateral side (in a direction orthogonal to the longitudinal direction of the foil-like negative electrode plate).

The electrode assembly 3 of the present embodiment is formed by winding the foil-like positive electrode plate and the like, and then crushing the wound body in a direction orthogonal to the winding axis thereof to form the wound body into a flattened shape, thereby making the electrode assembly 3 conformal to the flattened case BC.

The electrode assembly 3 is housed in the can body 1 in such a position that the winding axis of the foil-like positive electrode plate and the like is parallel to the longitudinal direction of the cover portion 2. Consequently, the electrode assembly 3 satisfies the position relationship in which the connecting portion 4a of the current collector 4 taps into the position of the uncoated parts 3a of the foil-like positive electrode plate, and the connecting portion 6a of the current collector 6 taps into the position of the uncoated parts 3b of the foil-like negative electrode plate.

The uncoated parts 3a of the foil-like positive electrode plate are welded to the connecting portion 4a of the current collector 4 in a state of being bundled, and the uncoated parts 3b of the foil-like negative electrode plate are welded to the connecting portion 6a of the current collector 6 in a state of being bundled. Thus, the electrode assembly 3 is supported by the second posture parts SP of the current collectors 4 and 6.

As described above, the positive electrode-side terminal bolt 5 attached to the cover portion 2 made from metal (specifically, aluminum) is electrically connected to the positive electrode-side current collector 4, and the negative electrode-side terminal bolt 7 is electrically connected to the negative electrode-side current collector 6.

The structure of mounting the terminal bolt 5 on the cover portion 2 and the structure of coupling the terminal bolt 5 with the current collector 4, and the structure of mounting the terminal bolt 7 on the cover portion 2 and the structure of coupling the terminal bolt 7 with the current collector 6 are substantially the same and arranged symmetrically. Accordingly, a description will hereinafter be given primarily of the positive electrode-side configuration.

Figure 3:
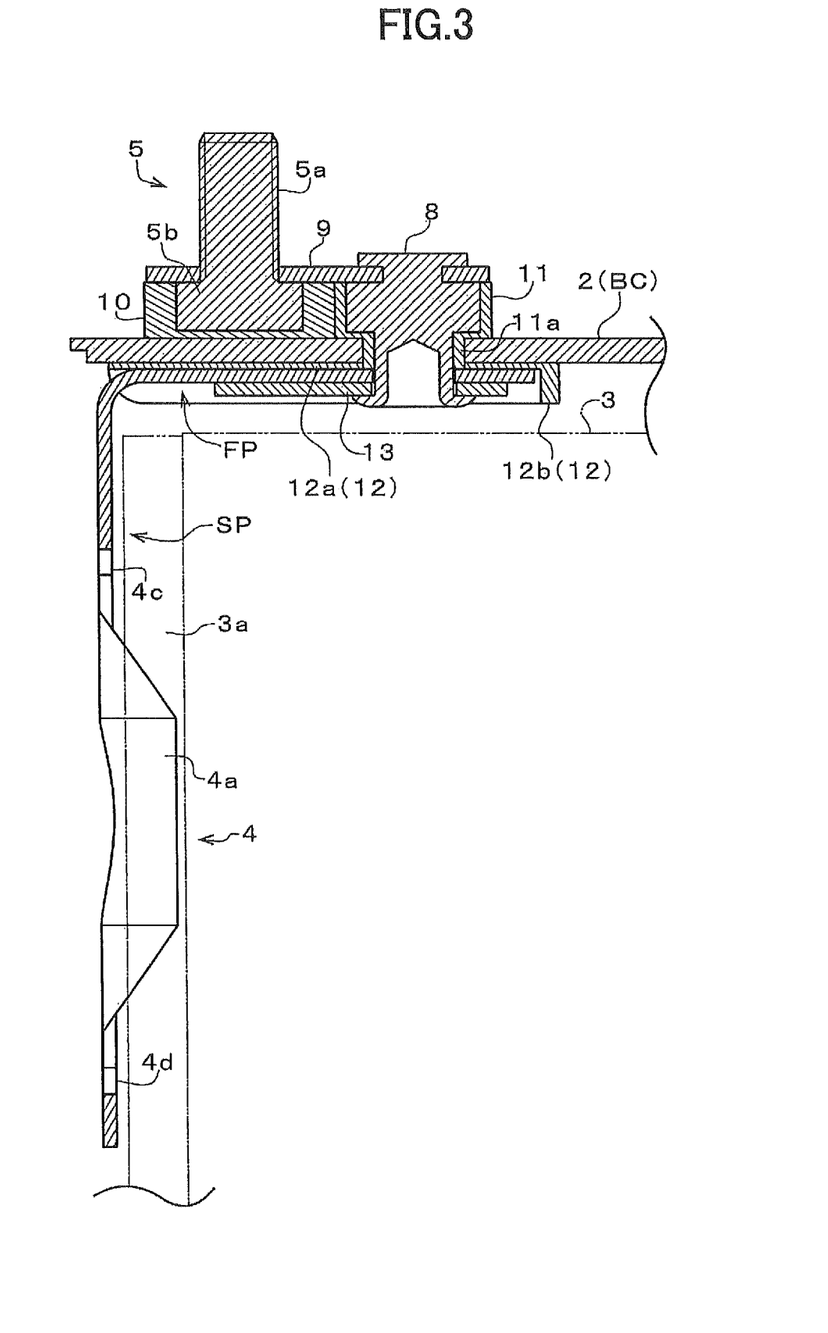
FIG. 3 is a cross-sectional view illustrating substantial parts according to the embodiment of the present invention.

As illustrated in the cross-sectional view of FIG. 3, the terminal bolt 5 is electrically connected to the current collector 4 through the rivet 8 and a bus bar 9. The rivet 8 is made from a metal material, more specifically, aluminum on the positive electrode side as other positive electrode-side metal members. The bus bar 9 is also made from a metal material, i.e., a bus bar made from nickel-plated copper is used for the bas bar 9. Alternatively, the bas bar 9 may be formed from aluminum as the rivet 8.

As illustrated in FIG. 4, the head of the rivet 8 is fixed to the bus bar 9 with the bus bar 9 clamped in the head. A hole 9a for a threaded portion 5a of the terminal bolt 5 to be inserted through is formed in the bus bar 9 in a position thereof adjacent to the fixed position of the rivet 8.

A retaining frame 10 in which a saucer-shaped concave portion the upper surface side of which is open and which is conformal to the rectangular shape of the head 5b of the terminal bolt 5 is formed is fixed on the cover portion 2. The terminal bolt 5 is stopped from rotation as the result of the head 5b of the terminal bolt 5 fitting into the concave portion.

The retaining frame 10 is formed from resin which is an electrical insulation material to ensure electrical insulation between the terminal bolt 5 and the cover portion 2.

A current path from the current collector 4 to the terminal bolt 5 is ensured electrical insulation from the cover portion 2 by an upper gasket 11 and a resin plate 12 both of which are formed from an electrical insulation material (more specifically, resin) and are sealing members. In addition, the current path is hermetically sealed at a location of the cover portion 2 where the rivet 8 penetrate through the cover portion 2.

The upper gasket 11 has a structure in which a tubular part 11a to be fitted into an opening 2a of the cover portion 2 is attached to the bottom portion of a saucer-shaped rectangular solid container the upper portion of which is open. A portion of the rivet 8 near the head thereof is held by the saucer-shaped rectangular solid container, and the rivet 8 is fitted into the internal space of the tubular part 11a.

Under the condition of the terminal bolt 5 and the like being mounted on the cover portion 2, the bottom portion of the upper gasket 11 is sandwiched between the head of the rivet 8 and the cover portion 2.

Under the condition of the current collector 4 and the like being mounted on the cover portion 2, the resin plate 12 is sandwiched between the first posture part FP of the current collector 4 and the cover portion 2.

The resin plate 12 includes a thin plate-shaped base portion 12a substantially the same in shape as the upper end (first posture part FP) of the current collector 4 extending along the cover portion 2 when viewed in the normal-line direction of the base portion 12a, and a short vertical wall portion 12b rising from the edges of the base portion 12a while forming a right angle with the base portion 12a.

An opening 12c for the tubular part 11a of the upper gasket 11 and the rivet 8 to be inserted through is formed in the base portion 12a of the resin plate 12.

On the lower surface side (i.e., on the side where the electrode assembly 3 is present) of the first posture part FP of the current collector 4, a reinforcing member 13 in which an opening 13a for the rivet 8 to be inserted through is formed is arranged in direct contact with the electrode assembly 3 side surface of the first posture part FP.

The reinforcing member 13 is composed of a plate-shaped member made from the same metal material as that of the current collector 4. More specifically, the reinforcing member 13 is composed of the same aluminum plate material as the current collector 4. The reinforcing member 13 is the same in width as the first posture part FP of the current collector 4, and has a rectangular shape with a direction toward the connecting portion (the bent portion of each of the current collectors 4 and 6) between the first posture part FP and the second posture part SP being the longitudinal direction of the rectangular shape.

The rivet 8 is caulked in a state of penetrating through the tubular part 11a of the upper gasket 11, the opening 2a of the cover portion 2, the opening 12c of the resin plate 12, the opening 4b of the current collector 4, and the opening 13a of the reinforcing member 13. Thus, the rivet 8 fixes the first posture part FP of the current collector 4 to the cover portion 2, while sandwiching the upper gasket 11, the cover portion 2, the resin plate 12, the first posture part FP of the current collector 4, and the reinforcing member 13.

As illustrated in FIGS. 2 and 4, the negative electrode-side configuration is arranged symmetrically to the positive electrode-side configuration with respect to the center of the cover portion 2. Accordingly, on the outer side of the case BC, the head 7b of the terminal bolt 7 is held by the retaining frame 14 fixed to the cover portion 2, and the rivet 15 and the terminal bolt 7 are electrically connected to each other by the bus bar 16 fixed to the rivet 15.

The rivet 15 is caulked with the head thereof held on the upper gasket 17, while sandwiching inside the upper gasket 17, the cover portion 2, the resin plate 18, the current collector 6, and the reinforcing member 19.

The terminal bolt 7, the bus bar 16 and the rivet 15 are composed of conductive metal materials, and the current collector 6 and the terminal bolt 7 are electrically connected to each other by the rivet 15 and the bus bar 16.

The current collector 6 and the reinforcing member 19 are composed of the same type of metal material and, specifically, both are made from copper.

In the layout of the above-described respective components, the terminal bolts 5 and 7 which are connecting portions for wiring connection with other circuit components, such as battery cells, are respectively arranged on the end portions of the cover portion 2 in the longitudinal direction thereof. In addition, the rivets 8 and 15 are arranged closer to the center of the cover portion 2 than the terminal bolts 5 and 7.

On the other hand, the second posture part SP of the current collector 4 is arranged along and closer to a short-side vertical wall of the can body 1, in order to make the volume of the electrode assembly 3 as large as possible. Likewise, the bent portion where the first posture part FP and the second posture part SP are connected is positioned in the end portion of the cover portion 2 in the longitudinal direction thereof.

As a result, distances from the abovementioned bent portions to the fixed positions of the rivets 8 and 15 are made longer in the first posture parts FP of the current collectors 4 and 6. Consequently, moment working on the fixed positions of the rivets 8 and 15 becomes larger, thus causing a large force to work on the fixed positions of the rivets 8 and 15.

Under such a condition as described above, the reinforcing members 13 and 19 are arranged on the lower surface sides of the first posture parts FP of the current collectors 4 and 6 and held inside by the rivets 8 and 15. Consequently, the above-mentioned force is prevented from concentrating on the fixed positions of the rivets 8 and 15. Thus, it is possible to prevent the current collectors 4 and 6 from becoming damaged at the fixed positions of the rivets 8 and 15.

In particular, the reinforcing members 13 and 19 are preferably arranged so as to extend longer toward the second posture part SP side on the side where the electrode assembly 3 is present than the rivet 8, and sandwiched and fixed between the first posture parts SP and the rivets, in order to effectively disperse stress.

Other Embodiments

Hereinafter, other embodiments of the present invention will be cited.

(1) In the above-described embodiment, a case is cited in which the cell RB is configured so that the electrode assembly 3 is supported by the second posture parts SP of the current collectors 4 and 6, and the weight of the electrode assembly 3 is received by the fixed parts of the rivets 8 and 15. The present invention is still applicable, however, to configurations other than the configuration in which the weight of the electrode assembly 3 is received by the fixed parts of the rivets 8 and 15.

Figure 5:
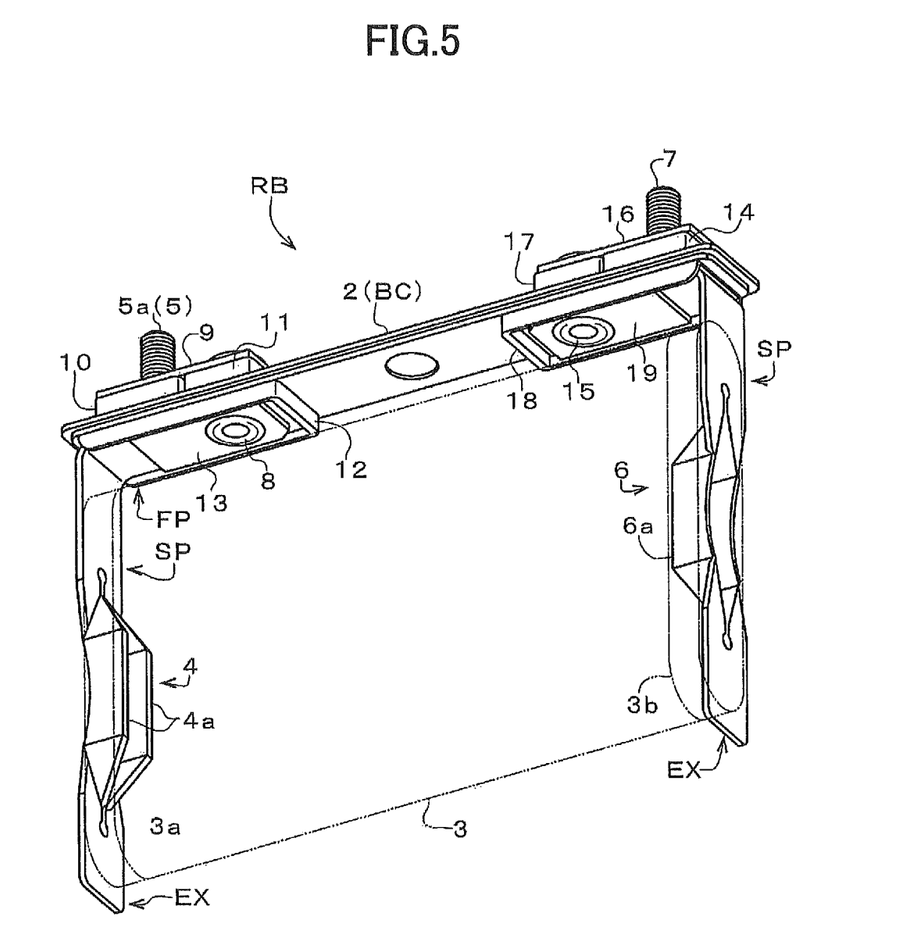
FIG. 5 is a perspective view illustrating the interior of a battery cell according to another embodiment of the present invention.

For example, as illustrated in FIG. 5 corresponding to FIG. 2 in the above-described embodiment, the reinforcing members 13 and 19 may be provided in the same way as in the above-described embodiment also in a case where the weight of the electrode assembly 3 is received by the bottom of the case BC.

In FIG. 5, the lower ends of the second posture parts SP of the current collectors 4 and 6 denoted by the reference character "EX" in the figure are shaped so as to extend to the bottom of the case BC. Consequently, the cell RB is configured so that when the cover portion 2 into which the current collectors 4 and 6 and other components are assembled is overlaid on the can body 1, the lower ends of the second posture parts SP of the current collectors 4 and 6 denoted by the reference character "EX" abut on the bottom with an appropriate electrical insulator interposed between each lower end and the bottom. Such a configuration as described above is especially effective in a large-size battery cell in which the electrode assembly 3 is heavy.

(2) In the above-described embodiment, a case is cited in which the reinforcing members 13 and 19 are composed of a metal material. Alternatively, however, the reinforcing members 13 and 19 may be composed of other various materials, such as ceramics or resin.

(3) In the above-described embodiment, a case is cited in which the reinforcing members 13 and 19 are composed of the same metal material as that of the current collectors 4 and 6. Alternatively, however, the positive electrode-side reinforcing member 13 may be composed of, for example, an aluminum alloy, and the negative electrode-side reinforcing member 19 may be composed of, for example, a copper alloy. That is, the reinforcing members 13 and 19 and the current collectors 4 and 6 may respectively be composed of the same type of metal material. The contact corrosion of dissimilar metals can be prevented even in that case.

(4) In the above-described embodiment, a case is cited in which the connecting portions 4a and 6a of the current collectors 4 and 6 connected with the electrode assembly 3 are formed by forming pairs of upper and lower through-holes 4c and 4d and upper and lower through-holes 6c and 6d in the respective second posture parts of the current collectors 4 and 6 in a state of being flat plates, forming incisions between the through-holes 4c and 4d and between the through-holes 6c and 6d, and extruding the incised parts by means of press work or the like. A specific shape of the connecting portions 4a and 6a of the current collectors 4 and 6 may be varied as appropriate, however.

Figure 6:
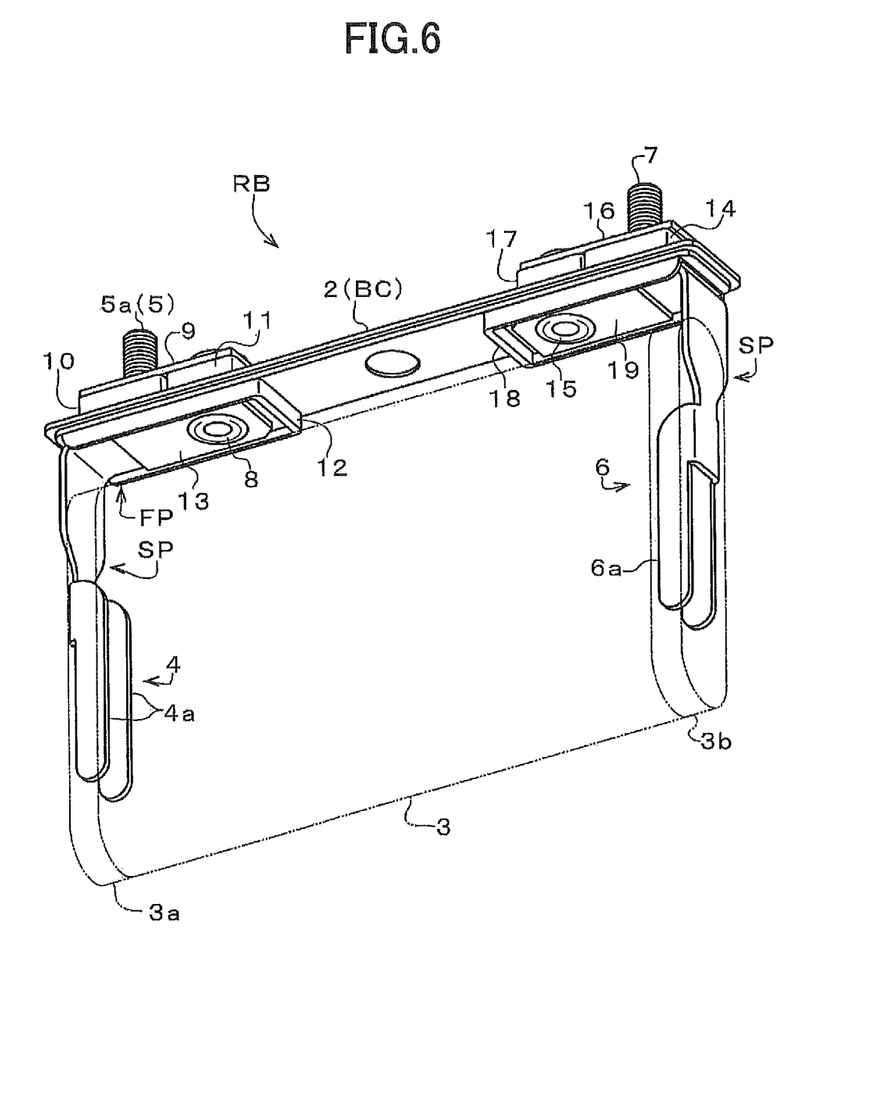
FIG. 6 is a perspective view illustrating the interior of a battery cell according to yet another embodiment of the present invention.

For example, as illustrated in FIG. 6 corresponding to FIG. 2 in the above-described embodiment, the leading-end side of each current collector may previously be formed into a two-forked shape in a state of being a flat plate, and then the two-forked portion may be bent toward the side where the electrode assembly 3 is present, thereby forming the respective connecting portions 4a and 6a.

(5) In the above-described embodiment, an example has been described in which the reinforcing member 13 is arranged so as to abut on the lower surface side of the first posture part FP and extend along the first posture part FP. Alternatively, however, the first posture part of each current collector and each reinforcing member may previously be formed into an integral structure by means of welding or the like.

(6) In the above-described embodiment, an example has been described in which a rivet is used as the fixing member which penetrates through an opening formed in the battery case at the first posture part of each current collector. The fixing member is not limited to a rivet, however, but other fixing members may be used. For example, the first posture part may be fixed using a bolt and a nut. When the first posture part is fixed using a bolt, airtightness can be ensured by flowing, for example, resin into between the bolt and the through-hole thereof including the opening 2a of the cover portion 2.

(7) In the above-described embodiment, a description has been given of a secondary battery as the electric storage device according to the present invention. The present invention is not limited to secondary cells, however. Needless to say, the present invention is also applicable to electric storage devices, such as primary cells and electric double layer capacitors, provided with an electric storage element, electrode terminals, and current collectors which connect these components.

REFERENCE SIGNS LIST

BC: Electric storage device case (battery case)
FP: First posture part
SP: Second posture part
3: Electric storage element (electrode assembly)
4, 6: Current collector
5, 7: Electrode terminal
8, 15: Fixing member (rivet)
13, 19: Reinforcing member

The invention claimed is:

1. An electric storage device, comprising:
an electric storage element arranged inside an electric storage device case;
an electrode terminal arranged outside the electric storage device case;
a current collector including a first posture part and a second posture part, the first posture part extending along a surface of the electric storage device case on which the electrode terminal is arranged, the second posture part extending from an end portion of the first posture part toward a side opposite to the electrode terminal, the current collector being fixed at the first posture part by a fixing member penetrating through an opening formed in the electric storage device case, and the current collector supporting the electric storage element by the second posture part, thereby electrically connecting the electrode terminal and the electric storage element; and
a reinforcing member arranged on a first posture part side where the electric storage element is present, so as to extend longer toward a second posture part side than the fixing member, and sandwiched and fixed between the first posture part and the fixing member,
wherein the fixing member comprises a penetrating part penetrating the opening of the electric storage device case and an extending part extending along the first posture part of the current collector, and
wherein the reinforcing member is sandwiched and fixed between the first posture part and the extending part of the fixing member.

2. The electric storage device according to claim 1, wherein the first posture part of the current collector and the reinforcing member comprise a same type of metal material and arranged in contact with each other.

3. The electric storage device according to claim 1, wherein the current collector and the reinforcing member comprise plate-shaped members.

4. The electric storage device according to claim 3, wherein the reinforcing member has a rectangular shape, a direction from a portion fixed by the fixing member toward a connecting portion between the first posture part and the second posture part being a longitudinal direction of the rectangular shape.

5. The electric storage device according to claim 1, wherein the reinforcing member has a rectangular shape, a direction from a portion fixed by the fixing member toward a connecting portion between the first posture part and the second posture part being a longitudinal direction of the rectangular shape.

6. The electric storage device according to claim 1, wherein the fixing member comprises a rivet.

7. The electric storage device according to claim 6, wherein an end of the rivet is caulked, and the reinforcing member is sandwiched and fixed between the first posture part and the caulked end of the rivet.

8. The electric storage device according to claim 1, wherein the reinforcing member includes a plate-shaped member.

9. The electric storage device according to claim 1, wherein the penetrating part abuts a side surface of the first posture part.

10. The electric storage device according to claim 9, wherein the penetrating part further abuts a side surface of the reinforcing member.

11. The electric storage device according to claim 10, wherein a top surface of the reinforcing member abuts a bottom surface of the first posture part.

12. The electric storage device according to claim 11, wherein a top surface of the extending part abuts a bottom surface of the reinforcing member.

13. The electric storage device according to claim 1, wherein the extending part extends from an end portion of the penetrating part, parallel to the first posture part of the current collector, toward a connecting portion between the first posture part and the second posture part.

14. An electric storage device, comprising:
an electric storage device case comprising a can body and a cover plate;
an electric storage element arranged inside the electric storage device case;
an electrode terminal arranged outside the cover plate;
a fixing member penetrating through the cover plate of the electric storage device case;
a current collector including a first posture part and a second posture part, the first posture part extending along a surface of the cover plate on which the electrode terminal is arranged, and the second posture part extending from an end portion of the first posture part toward a side opposite to the electrode terminal; and
a reinforcing member arranged on a first posture part side where the electric storage element is present, so as to extend longer toward a second posture part side than the fixing member, and sandwiched and fixed between the first posture part and the fixing member;
wherein the current collector is fixed to the cover plate at the first posture part by the fixing member, the current collector supporting the electric storage element by the second posture part, thereby electrically connecting the electrode terminal and the electric storage element,
wherein the fixing member comprises a penetrating part penetrating an opening of the electric storage device case and an extending part extending along the first posture part of the current collector, and
wherein the reinforcing member is sandwiched and fixed between the first posture part and the extending part of the fixing member.

15. The electric storage device according to claim 14, wherein the reinforcing member has a rectangular shape, a direction from a portion fixed by the fixing member toward a connecting portion between the first posture part and the second posture part being a longitudinal direction of the rectangular shape.

16. The electric storage device according to claim 14, wherein the fixing member comprises a rivet, and
wherein an end of the rivet is caulked, and the reinforcing member is sandwiched and fixed between the first posture part and the caulked end of the rivet.

17. The electric storage device according to claim 14, wherein the reinforcing member includes a plate-shaped member.

18. The electric storage device according to claim 17, wherein the penetrating part abuts a side surface of the first posture part and a side surface of the reinforcing member.

19. The electric storage device according to claim 18, wherein a top surface of the reinforcing member abuts a bottom surface of the first posture part, and
wherein a top surface of the extending part abuts a bottom surface of the reinforcing member.

20. The electric storage device according to claim 14, wherein the extending part extends from an end portion of the penetrating part, parallel to the first posture part of the current collector, toward a connecting portion between the first posture part and the second posture part.

* * * * *